United States Patent
Ueyama

[19]

[11] Patent Number: 6,091,552
[45] Date of Patent: Jul. 18, 2000

[54] ZOOM LENS MECHANISM AND ITS ASSEMBLING METHOD

[75] Inventor: Masayuki Ueyama, Takarazuka, Japan

[73] Assignee: Minolta Co., Ltd., Osaka, Japan

[21] Appl. No.: 09/026,675

[22] Filed: Feb. 20, 1998

[30] Foreign Application Priority Data

| Feb. 21, 1997 | [JP] | Japan | 9-037492 |
| Feb. 21, 1997 | [JP] | Japan | 9-037502 |
| Feb. 21, 1997 | [JP] | Japan | 9-037505 |

[51] Int. Cl.[7] .................................................. G02B 15/14
[52] U.S. Cl. ........................... 359/694; 359/699; 359/700
[58] Field of Search .................................... 359/699, 700, 359/701, 702, 686, 689, 694, 821, 822, 823

[56] References Cited

U.S. PATENT DOCUMENTS

| 5,490,015 | 2/1996 | Umeyama et al. | ...................... 359/824 |
| 5,576,894 | 11/1996 | Kuwana | ................................... 359/701 |
| 6,002,534 | 12/1999 | Ueyama | ................................... 359/824 |

*Primary Examiner*—Georgia Epps
*Assistant Examiner*—Michael A. Lucas
*Attorney, Agent, or Firm*—Burns, Doane, Swecker & Mathis, LLP

[57] ABSTRACT

A zoom lens apparatus in which its dimension in a radial direction of a lens can be reduced. A plurality of flat movable plates which support lens groups at one ends thereof are slidably stacked one over the other on a fixing plate and which are guided straight along an optical axis of the lens by linearly advancing guide pins, projecting from the fixing plate and engaging guide holes formed on the movable plates. One end of an interlocking bar is rotatably mounted on a first movable plate, and an interlocking pin projecting from the other end of the bar engages cam holes of the other movable plates and the fixing plate. As the first movable plate is moved along the optical axis by a piezoelectric linear actuator, the other movable plates are interlockingly moved thereby, and the lens groups are driven for a zooming operation.

23 Claims, 9 Drawing Sheets

ZOOM LENS MECHANISM AND ITS ASSEMBLING METHOD

This application is based on applications Nos. 9-37492, 9-37502 and 9-37505 filed in Japan, the contents of which are hereby incorporated by reference.

BACKGROUND OF THE INVENTION

1. Field of the Invention

The present invention relates to a zoom lens mechanism, as used in a camera, and its assembling method, and particularly relates to the zoom lens mechanism in which a linear actuator is used, and its assembling method.

2. Description of the Related Arts

Conventionally, a general zoom lens mechanism has a construction in which a plurality of cylindrical members, like cam cylinders, are arranged one above the other on an outer circumference of a lens group.

Meanwhile, conventionally, a so-called suspended type of lens barrel has a construction in which there are installed a guide bar for linearly guiding a holder that holds a lens group, a cam plate for moving the holder, and the like, around the lens group.

In this way, according to the conventional zoom lens mechanism, there are mounted various components and parts around the lens group. Consequently, the zoom lens mechanism increases in its radial size around the entire periphery of the lens group.

On the other hand, in recent years, there is an increasing demand for making more compact and smaller an image-taking element in fields of a video camera, a digital camera, and the like, and at the same time for making smaller the zoom lens mechanism itself, in order to realize a thinner type of a video camera, a digital camera, and the like.

However, according to the conventional zoom lens mechanism, the radial size around the whole periphery of the lens group is large. Accordingly, it is difficult to make thinner and smaller the zoom lens mechanism itself.

On the other hand, according to a conventional zoom lens mechanism, a plurality of lens groups with different zooming components are held by lens holders, respectively, in which each lens holder is supported by a lens support mechanism and is moved along an optical axis by an interlocking device. That is, the plurality of lens groups are moved for zooming operation by the movement of the lens holders which are driven by the lens support mechanism.

Such a conventional zoom lens mechanism is assembled usually with the following steps.

First, the lens groups are built in lens holders, respectively. In this process, one lens or more than one lens in the lens group is positioned with respect to the lens holder.

Next, the lens support mechanism is assembled together with the lens holder which the lens group is built and set in. That is, the lens holder is assembled at the same time while the lens support mechanism is assembled. This means that a lens holder is not built in a lens support mechanism the assemblage of which is already finished. In the zoom lens mechanism that has once been assembled in this way so that the lens support mechanism supports the lens groups, its precision or accuracy in alignment or positioning of each lens group with respect to the optical axis is affected by the component precision of each lens holder, the precision or accuracy in positioning of each lens with respect to the lens holder, and the precision or accuracy in assemblage of each lens holder relative to the lens support mechanism.

Next, the position of the lens group is adjusted from the front end and/or rear end of the zoom lens mechanism. More specifically, in case that the zoom lens mechanism is once assembled, the lens group placed at the front end and/or rear end thereof is aligned relative to the optical axis. With the adjustment of the lens group relative thereto, it is possible to attain a desired precision thereof.

In order to adjust the alignment of the lens group placed at the front end and/or rear end relative to the optical axis, it is generally necessary to perform such a troublesome work as pushing an outer circumferential surface of the lens mounted in the lens frame in the axial direction, with a force of access thereto in the same axial direction so as to slide and displace the lens in small steps bit by bit in its radial direction.

However, as to the lens groups being positioned at intermediate positions other than such lens groups being positioned at the front and rear ends thereof, it is not possible to adjust the alignment of those lens groups relative to the optical axis, because of a difficulty in getting an access thereto due to an interference by the arrangement in which there are mounted some parts to constitute the lens support mechanism around them.

As already explained, in recent years, there is an increasing demand for making more compact and smaller an image-taking element in fields of a video camera, a digital camera, and the like, and at the same time for making smaller the zoom lens mechanism itself, in order to realize a thinner type of a video camera, a digital camera, and the like. In case that the zoom lens mechanism is miniaturized, the allowance in error of decentering the lens group with respect to the optical axis also becomes smaller. This makes it necessary to align the lens group relative thereto with much higher precision than the precision of the conventional zoom lens mechanism.

However, because the work to adjust the lens groups at the front and rear ends thereof relative to the optical axis, is so troublesome even in the conventional zoom lens mechanism, it is quite more difficult to align them relative thereto with much higher precision by the same method as the conventional one.

Further, it is difficult to attain a desired high precision without aligning the lens groups at intermediate positions relative to the optical axis, as in the conventional mechanism.

On the other hand, conventionally, there has been provided a linear actuator, as used as a driving unit of the zoom lens mechanism, which is specially used for a precision equipment such as a video camera.

For example, U.S. Pat. No. 5,225,941 discloses a linear actuator 500, as shown in FIG. 15. According to the construction, a bar-shaped engaging member 508 is fixed to one end face 504 of a lamination type of piezoelectric device or an electromechanical transducer 502. The device 502 includes a lamination of a plurality of piezoelectric elements that generate a displacement of expansion and contraction, responsive to a predetermined electrical signal supplied to the electromechanical transducer 502. The one end face 504 of the piezoelectric device 502 is in the direction of the displacement of expansion and contraction, i.e. in the direction of the lamination of the plurality of piezoelectric elements of the electromechanical transducer 502.

The other end face 506 of the electromechanical transducer 502 in the direction of the displacement is fixed to a fixing member 509. A member to be driven 510 is slidably supported by the engaging member 508 and a guide bar 514 which is fixed in parallel to the engaging member 508. That is, the engaging member 508 is inserted into a sliding contact hole 512 of the member to be driven 510, and the sliding contact hole 512 of the member to be driven 510 is pressed against the engaging member 508 by a springly repulsive force of a plate spring 516 which is screwed to the member to be driven 510. With the construction, the engaging member 508 and the member to be driven 510 are frictionally engaged with each other.

The individual piezoelectric elements of the electromechanical transducer 502 expand when a predetermined voltage is applied thereto. Therefore, the linear actuator 500 enables the member to be driven 510 to move along the bar-shaped engaging member 508 due to the expansion and contraction of the electromechanical transducer 502 in the direction of displacement thereof, when a periodical voltage is applied to the electromechanical transducer 502.

More specifically, for example, the member to be driven 510 can be driven intermittently or periodically in small steps bit by bit along the bar-shaped engaging member 508 by applying a voltage to the electromechanical transducer 502 in such a manner that its expanding speed and contracting speed of the electromechanical transducer 502 are different from each other, and that there alternately occurs a slide between the member to be driven 510 and the bar-shaped engaging member 508, and a feed of the member to be driven 510 and the bar-shaped engaging member 508 relative to the fixing member 509.

Explaining more in detail in terms of the principle of how the linear actuator operates, when the engaging member 508 moves slowly relative to the fixing member 509, the member to be driven 510 moves along with the engaging member 508 by a frictional force exerting between the member to be driven 510 and the engaging member 508. That is, there is no slide between the member to be driven 510 and the engaging member 508.

Meanwhile, when the engaging member 508 moves faster or quicker than a certain level in speed, and when an inertial force of the member to be driven 510 surpasses the frictional force exerting therebetween, there occurs a slide at a frictional engaging portion between the member to be driven 510 and the engaging member 508, so that the member to be driven 510 remains stationary or almost stationary relative to the fixing member 509 while only the engaging member 508 moves relative thereto.

Namely, the member to be driven 510 is fed together with the engaging member 508 at time of driving the engaging member 508 in one direction, and the member to be driven 510 is slid relative to the engaging member 508 so as to be stationary or almost stationary relative to the fixing member 509 at time of driving the engaging member 508 in the other direction. And, the operation is repeated intermittently or periodically, to make it possible to move the member to be driven 510 in the one direction intermittently or periodically relative to the fixing member.

However, according to the linear actuator 500, a long engaging member 508, fixed to the one end face 504 of the electromechanical transducer 502, is used. Therefore, a large space for the engaging member 508 must be set aside in the linear actuator, resulting in difficulty in realizing a compact actuator.

Furthermore, according to the conventional linear actuator 500, its vibrating system including the bar-shaped engaging member 508 is longer; therefore, its resonance point, etc. is lower. Namely, the frequency able to be used in driving the linear actuator 500 is limited to a lower range thereof, thus making it difficult to improve its driving capacity and performance.

SUMMARY OF THE INVENTION

Accordingly, it is an object of the present invention to provide a zoom lens mechanism a dimension of which can be reduced in one radial direction.

It is another object of the present invention to provide a method for assembling the zoom lens mechanism in which it is easy to adjust the lens groups to each other relative to the optical axis.

It is still another object of the present invention to provide a method for driving the zoom lens which is as used in the zoom lens mechanism a dimension of which can be reduced in one radial direction.

It is still another object of the present invention to provide a linear actuator, which contributes to shortening of its length, so that there is no need of a large space therefor and so that the driving capacity and performance thereof is enhanced.

In carrying out the present invention in one preferred mode, there is provided a zoom lens mechanism, comprising: a stationary member; a plurality of movable members which are overlapped one over the other on the stationary member and which are slidably to each other and to the stationary member in a direction of optical axis; a driving device which moves the movable members by predetermined distances with respect to the stationary member respectively in the direction of optical axis; a lens support part which projects from a side of each of the movable members; and a lens group which is supported by the lens support part.

According to the mechanism, it is possible to reduce a total thickness of the stationary member and the movable members to the thickness which is generally equal to or less than the diameter of the lens group, by designing each of the stationary member and the movable members so that a thickness thereof is sufficiently small in comparison with of the diameter of the lens group.

Consequently, there is provided the zoom lens mechanism a dimension of which can be reduced as much as possible in one radial direction of the lens group.

In the mechanism, the plurality of movable members may be provided on one side of the stationary member, or on both sides thereof.

In the mechanism, the lens support part projects from the side of each of the movable members. Alternatively, the lens support part may project from a surface of the movable member.

In the mechanism, one set of zoom lens optical system may be provided by mounting a plurality of lens groups only on one side of the movable members. Alternatively, two sets of zoom lens optical system may be provided by mounting a plurality of lens groups on both sides of the movable members. Alternatively, two sets of zoom lens optical system may be provided by mounting a plurality of lens groups only on one side of the movable members.

In the mechanism, each movable member may be individually driven so that the movement and position of each movable member relative to the stationary member may be controlled.

In the mechanism, it is preferable that the movable members comprise a first plate and a second plate, and wherein the driving device comprises: a first drive device which moves the first plate by a first distance with respect to the stationary member in the direction of optical axis; and a second drive device which moves the second plate and which interlocks with a movement of the first plate so that the second drive device moves the second plate by a second distance with respect to the stationary member in the direction of optical axis when the first plate moves by the first distance.

According to the mechanism, the movement or displacement of the first plate relative to the stationary member, automatically controls the movement or displacement of the second plate relative thereto. Therefore, only by controlling the movement or displacement of the first plate relative to the stationary member, the movement or displacement of the second plate is automatically controlled via the second drive device, so that a desired zooming operation can be realized. Namely, there is no need of controlling the movable members respectively; thus possible to simplify the zoom lens mechanism.

In the mechanism, it is preferable that the first drive device may comprise: a piezoelectric transducer which produces a repeatable linear displacement in the direction of optical axis, responsive to a voltage which is supplied to the piezoelectric transducer; and a frictional engaging member which is fixed to one of a pair of ends of the piezoelectric transducer.

In the mechanism, the piezoelectric transducer may be provided on a side of the stationary member in which arrangement the frictional engaging member can frictionally engage a side of the movable member. Alternatively, the piezoelectric transducer may be provided on a side of the movable member in which arrangement the frictional engaging member can frictionally engage a side of the stationary member.

In the mechanism, the piezoelectric transducer may be constituted by a plurality of piezoelectric elements which are overlapped one over the other in the direction of optical axis.

In the mechanism, when a predetermined voltage, like a sawtoothed periodic pulse form of voltage, for example, is supplied to the piezoelectric transducer, it expands or contracts responsive to the voltage which is applied thereto. With the expansion and contraction of the piezoelectric transducer, there occurs intermittently or periodically a slide and/or a feed between the frictional engaging member, and the movable member or the stationary member, so that there occurs a movement of the movable member with respect to the stationary member.

The piezoelectric transducer, used as a part of the first drive device, has an ability to move the first plate accurately by a minute unit of displacement relative to the stationary member, and at high speed relative thereto. Also, the first drive device can be miniaturized with the piezoelectric transducer. Consequently, it is possible to realize a thinner or compact zoom lens mechanism operated accurately at high speed, with the above construction.

In the arrangement, it is preferable that the other of the pair of ends of the piezoelectric transducer may be fixed to the stationary member, and the frictional engaging member may engage the first plate frictionally, and that the lens support parts project from a same side of the movable members along the direction of optical axis, wherein the piezoelectric transducer is arranged at a location opposite the same side of the movable members, and wherein the frictional engaging member frictionally engages an edge part of the first plate, in which the edge part is opposite the same side of the movable members and in which the edge part of the first plate is generally in parallel with the optical axis.

According to the mechanism, it is easy to constitute the movable member and the lens support part integrally. Also, the assemblage of the movable member, lens support part and piezoelectric transducer onto the stationary member in order, is facilitated, because there is no need of turning around the stationary member at time of the assemblage. That is, the zoom lens mechanism has a simple construction and is easy to assemble.

In the mechanism, more specifically, the frictional engaging member can comprise: a fixing wall part which is fixed to the one of the pair of ends of the piezoelectric transducer; a support wall part which connects to a periphery of the fixing wall part and which extends generally along a side of the piezoelectric transducer; and a frictional engaging part which is supported near the side of the piezoelectric transducer by the support wall part.

Preferably, the second drive device comprises: a first cam groove which is provided on the stationary member; a cam follower which is driven by the first cam groove of the stationary member when the first plate is moved by the first drive device; and a second cam groove which is provided on the second plate and which engages the cam follower, wherein the second plate is moved by a movement of the cam follower; and preferably, the second drive device further comprises an interlocking bar which is arranged along the first plate, in which one of a pair of ends of the interlocking bar is rotatably supported on the first plate and in which the cam follower is supported by the other of the pair of ends of the interlocking bar.

With the mechanism, it is easy to construct the second drive device so that the thickness of the second drive device is generally within the sum of respective thicknesses of the stationary member and the movable members.

In the mechanism, it is preferable that the lens group can be mounted on the lens support part in a direction generally perpendicular to the direction of optical axis.

With the mechanism, it is easy to align the lens group with respect to the direction of optical axis.

In the mechanism, it is preferable that the stationary member further comprises a pair of pins for guiding the movable member straight relative to the stationary member, in which the pair of pins project in a direction in which the plurality of movable members are overlapped one over the other on the stationary member, wherein each of the movable members comprises a pair of holes for guiding the movable member straight relative to the stationary member in the direction of optical axis, in which the pair of holes are provided in the direction of optical axis respectively, and wherein the pair of pins of the stationary member respectively pass through the pair of holes of each of the movable members with the pair of pins frictionally engaging the pair of holes, so that each of the movable members are guided straight in the direction of optical axis with respect to the stationary member.

With the mechanism, it is easy to construct the system for linearly guiding the movable member in the direction of optical axis relative to the stationary member so that the thickness of the system therefor is generally within the sum of respective thicknesses of the stationary member and the movable members.

In carrying out the present invention in another preferred mode, there is provided a method for assembling a zoom lens mechanism, comprising: a first step for assembling a lens support mechanism which supports a first lens frame and a second lens frame so that the first lens frame and the second lens frame are movable to each other, and for arranging the first lens frame and the second lens frame along an optical axis; a second step for giving a first lens group access to the first lens frame in a direction generally perpendicular to the optical axis, and for fixing the first lens group to the first lens frame; and a third step for giving a second lens group access to the second lens frame in the direction generally perpendicular to the optical axis, and for fixing the second lens group to the second lens frame while the second lens group is aligned relative to the first lens group.

According to the method, each lens group is approached to each corresponding lens frame in the direction generally perpendicular to the optical axis. Therefore, the alignment, or centering, of the lens groups relative to each other can be carried out easily, compared with the conventional method.

In the method, the first lens group and the second lens group may be fixed to the first lens frame and the second lens frame by adhesive, respectively.

In the method, the lens support mechanism can further supports a third lens frame together with the first lens frame and the second lens frame along the optical axis so that the third lens frame is movable to the first lens frame and the second lens frame, and wherein there can be further provided a fourth step for giving a third lens group access to the third lens frame in the direction generally perpendicular to the optical axis, and for fixing the third lens group to the third lens frame while the third lens group is aligned relative to the first lens group and the second lens group.

According to the mechanism, it is also possible to align or center, along the optical axis, the intermediate lens group relative to the other two lens groups between which the intermediate lens group is positioned.

In carrying out the present invention in still another preferred mode, there is provided a method for driving a zoom lens, comprising the steps of: driving a first plate in a direction of optical axis by a driving source, wherein the first plate holds a first lens group, and wherein the first plate is supported movably in the direction of optical axis by a stationary plate; and driving a second plate in the direction of optical axis by interlocking with a movement of the first plate, wherein the second plate holds a second lens group, wherein the second plate is movable relative to the first plate and the stationary plate, and wherein the second plate is supported movably in the direction of optical axis by the stationary plate.

In the method, there can be further provided a step of: driving a third plate in the direction of optical axis by interlocking with the movement of the first plate, wherein the third plate holds a third lens group, wherein the third plate is movable relative to the first plate, the second plate and the stationary plate, and wherein the third plate is supported movably in the direction of optical axis by the stationary plate.

In carrying out the present invention in still another preferred mode, there is provided: a linear actuator comprising: a piezoelectric element which expands and contracts in a displacement direction, in response to a predetermined electric signal that is applied to the piezoelectric element; and an engaging member which is fixed to one of a pair of end faces in the displacement direction of the piezoelectric element, wherein the engaging member frictionally engages a first member, and the other of the pair of end faces in the displacement direction of the piezoelectric element is fixed to a second member, in which an expansion and contraction of the piezoelectric element causes a slide between the engaging member and the first member and causes a feed of the engaging member and the first member relative to the second member so that there occurs a relative movement between the first member and the second member, and wherein the engaging member comprises: a fixing wall part which is fixed to the one of the pair of end faces of the piezoelectric elements, a support wall part which is fixed to a periphery of the fixing wall part, and which generally extends along a side of the piezoelectric element, and a frictionally engaging part which is supported by the support wall part, in which the frictionally engaging part frictionally engages the first member, and in which the frictionally engaging part extends sideways relative to the piezoelectric element.

According to the mechanism, because the frictionally engaging part of the engaging member is positioned on a side of the piezoelectric element, it is possible to shorten the length, of the linear actuator, up to about a length of the piezoelectric element. Therefore, there is provided a linear actuator, as used in the zoom lens mechanism, which is possible to be shorten in length for effectively using a space therein and for enhancing its driving efficiency.

In the mechanism, the fixing wall part, the support wall part, and the frictionally engaging part may be integrally formed, wherein the fixing wall may extend in a first planar direction, wherein the support wall part may comprise: a first piece which is connected to an edge of the fixing wall part, and which extends in a second planar direction that generally corresponds to a direction in which the piezoelectric element extends and that is generally perpendicular to the first planar direction, a pair of second pieces each of which is connected to each of a pair of edges, of the first piece, extending in the direction in which the piezoelectric element extends, and which extend, in a third planar direction generally perpendicular to both the first planar direction and the second planar direction, up to a part, of the piezoelectric element, opposite the first piece, and a pair of third pieces each of which is connected to each of a pair of edges, of the second pieces, opposite the first piece, in which a pair of the third pieces face towards each other along the part, of the piezoelectric element, opposite the first piece so that the pair of the third pieces cooperate with each other to frictionally hold the first member.

In the mechanism, the first piece, and the pair of second pieces, extend around the piezoelectric element as if the formers wrap around the latter, and in the construction, the distance between the fixing wall part and the third piece as a frictionally engaging part is relatively long. Therefore, it is easy to construct the engaging member so that the frictionally engaging part frictionally holds the first member with a predetermined spring coefficient. Also, by making the third piece of the engaging member approach to the piezoelectric element, it is possible to shorten the distance therebetween, thus possible to realize more compact linear actuator.

In other words, with the mechanism, it is possible to provide the linear actuator simple in construction in which there exerts a smaller moment on the piezoelectric element as an electromechanical transducer.

In the mechanism, the fixing wall part, the support wall part, and the frictionally engaging part may be integrally formed, wherein the fixing wall may extend in a first planar direction, wherein the support wall part may comprise: a first piece which is connected to an edge of the fixing wall part and which extends generally along a length of the piezoelectric element in a second planar direction that is generally perpendicular to the first planar direction, and a second piece which is connected to an edge, extending along the piezoelectric element, of the first piece, and which extends away from the piezoelectric element in a third planar direction which is generally perpendicular to both the first planar direction and the second planar direction, wherein a pair of surfaces of the second piece may be frictionally held by a holding device which is provided on the first member.

In the mechanism, the holding device of the first member can be mounted adjacent to the piezoelectric element.

With the mechanism, it is possible to provide the linear actuator simple in construction in which there exerts a smaller moment on the piezoelectric element as an electromechanical transducer.

In the mechanism, the fixing wall part, the support wall part, and the frictionally engaging part may be integrally formed, wherein the support wall part may comprise a pair of engaging pieces each of which is connected to each of a pair of opposing edges of the fixing wall part, wherein each of the engaging pieces may extend along a length of the piezoelectric element in a direction generally perpendicular to a direction in which a surface of the fixing wall part extends, and wherein a surface, opposite the piezoelectric element, of each of the engaging pieces, functions as a frictional engaging portion, in which the surfaces of the engaging pieces are frictionally engaged by a holding member which is provided on the first member.

According to the mechanism, a magnitude of the moment which is exerted on the piezoelectric element by the frictional engagement between one of the engaging pieces, and the holding member of the first member, is generally equal to a magnitude of the moment which is exerted on the piezoelectric element by the frictional engagement between the other of the engaging pieces, and the holding member of the first member. Namely, the both moments cancel each other, thus exerting no moment upon the piezoelectric element.

With the mechanism, it is possible to provide the linear actuator simple in construction in which there exerts a smaller moment on the piezoelectric element as an electromechanical transducer.

In the mechanism, the fixing wall part, the support wall part, and the frictionally engaging part may be integrally formed, wherein the fixing wall part may extend in a first planar direction, wherein the support wall part may comprise a pair of engaging pieces each of which is connected to each of a pair of opposite edges of the fixing wall part and each of which extends in a second planar direction generally perpendicular to both the first planar direction and a direction in which the piezoelectric elements extends, wherein each of the engaging pieces may extend on both sides of the piezoelectric element in the second planar direction so that a pair of opposing frictionally engaging projections are formed on each of the both sides of the piezoelectric element, in which each pair of opposing frictionally engaging projections cooperate to form a frictional engaging portion which frictionally holds the first member.

In the mechanism, the first member is frictionally held and engaged between each pair of opposing frictionally engaging projections as the frictional engaging portion. Namely, the piezoelectric element is positioned at a location in between the two pairs of the opposing frictionally engaging projections.

With this construction, the moments being exerted on the piezoelectric element due to its frictional engagement therebetween, are cancelled to each other; thus no actual moment being exerted upon the piezoelectric element.

With the mechanism, it is possible to provide the linear actuator simple in construction in which there exerts a smaller moment on the piezoelectric element as an electromechanical transducer.

Typically, the engaging member is made of one single plate-like member by bending it. Alternatively, the engaging member may be formed by cutting out, welding, injection molding, or the like.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
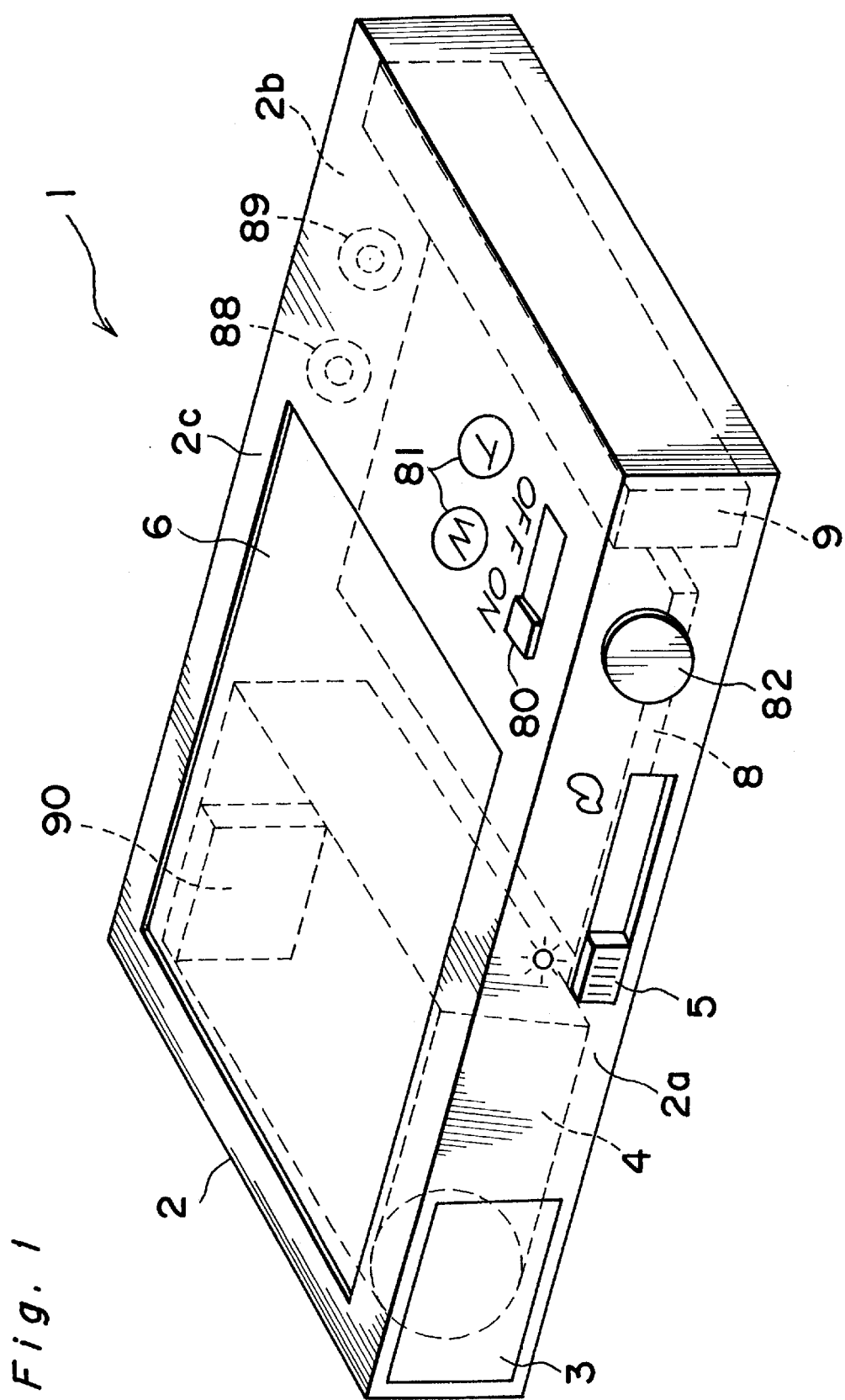
FIG. 1 is a perspective view of a digital camera according to a first embodiment of the present invention.

Before the description of the present invention proceeds, it is to be noted that like or corresponding parts are designated by like reference numerals throughout the accompanying drawings.

Referring to FIGS. 1 through 14, a description is made below on a digital camera according to each of four preferred embodiments to which the present invention is applied.

First, the digital camera of a first embodiment is described with reference to FIGS. 1 to 11.

The digital camera 1 to which the present invention is applied, has a housing 2 with a thin, rectangular solid shape. On one elongate side surface 2a of the housing 2, are arranged an image taking window 3, an exposure adjustment lever 5 and a shutter button 82. On the other side surface 2b thereof, are arranged an external power supply terminal 88 and a serial output terminal 89. On a top surface 2c thereof, are arranged a liquid crystal monitor 6 on which a captured image is displayed, a main switch 80 and a zoom switch 81.

Inside the housing 2, are accommodated an optical unit 4 having a CCD (Charge-Coupled Device) element 90 which is installed at a location opposite the image taking window 3, a circuit board 8 including an operation control circuit and a flash memory device and the like, and a charging battery 9. Amount of light received by the CCD element 90 can be adjusted by sliding the exposure adjustment lever 5 toward the image taking window 3 and by inserting an unshown exposure-adjustment ND filter in front of the optical unit 4.

The optical unit 4 includes four groups of zoom lens mechanisms. Each of the lens groups 12, 22, 32, 42 includes one or more than one lens, and has a zooming curve 11, 21, 31, 41, respectively, as schematically shown in FIG. 3. The optical unit 4, as shown in the perspective view of FIG. 2, has a first unit 10 including the first lens group 12, a second unit 20 including the second lens group 22, a third unit 30 including the third lens group 32, a fourth unit 40 including the fourth lens group 42, and a base unit 50 including a low-pass filter 52 and the CCD element 90.

The first to fourth units 10, 20, 30, 40 include first to fourth lens support members 14, 24, 34, 44, respectively, which comprise lens support portions 15, 25, 35, 45 projected from flat movable plates 16, 26, 36, 46, respectively. The lens support portions 15, 25, 35, 45 support the first to fourth lens groups 12, 22, 32, 42, respectively.

The base unit 50 includes a base member 54 having a low-pass filter support portion 55 and a CCD element support portion 92 protrusively provided on a top end of a flat fixing plate 56. The low-pass filter support portion 55 supports the low-pass filter 52, and the CCD element support portion 92 supports the CCD element 90.

Figure 2:
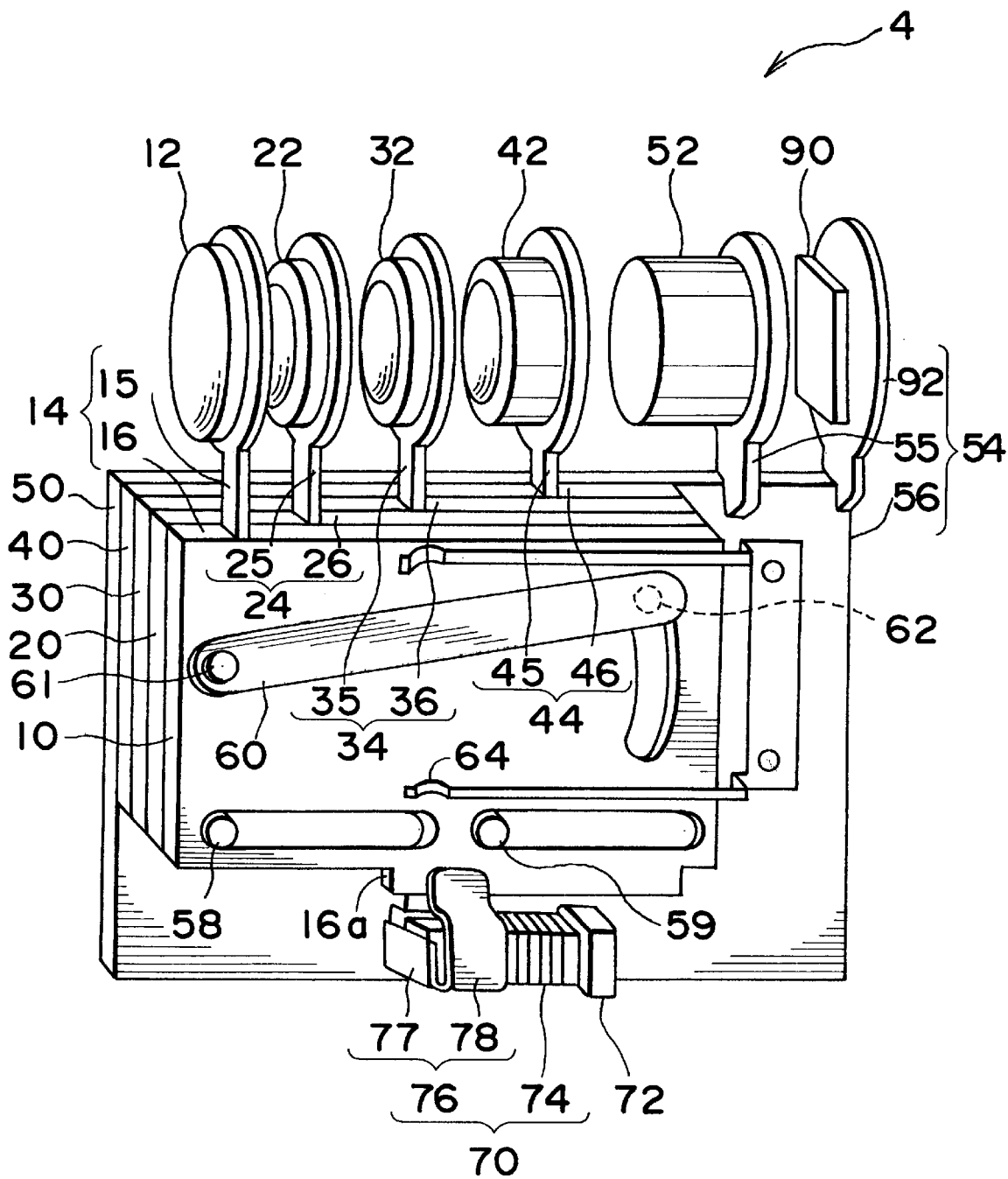
FIG. 2 is a perspective view of an optical unit of the digital camera of FIG. 1.
Figure 3:
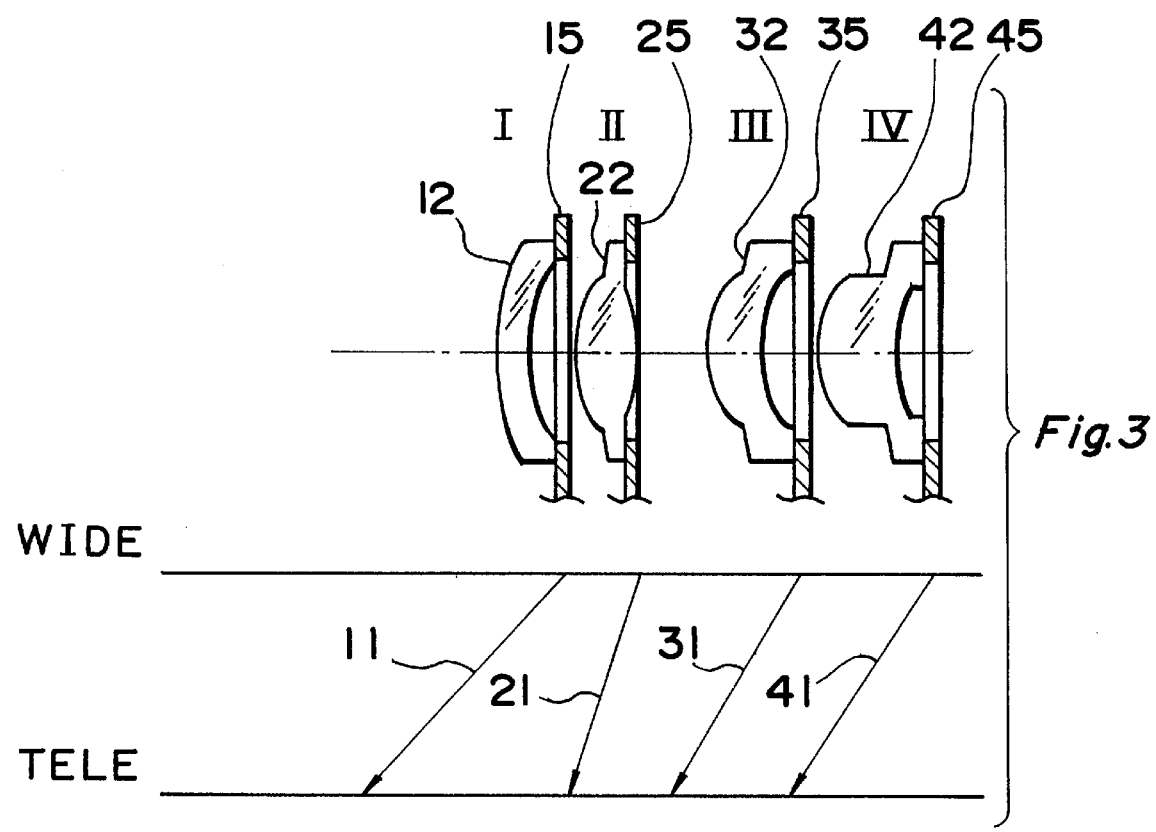
FIG. 3 is an explanatory view of a zoom lens which is used in the optical unit shown in FIG. 2.

On the flat fixing plate 56 of the base member 54, as shown in FIG. 2, the stacked movable plates 16, 26, 36, 46 of the first to fourth lens support members 14, 24, 34, 44 are rested, and are biased by a biasing spring 64.

Figure 4:
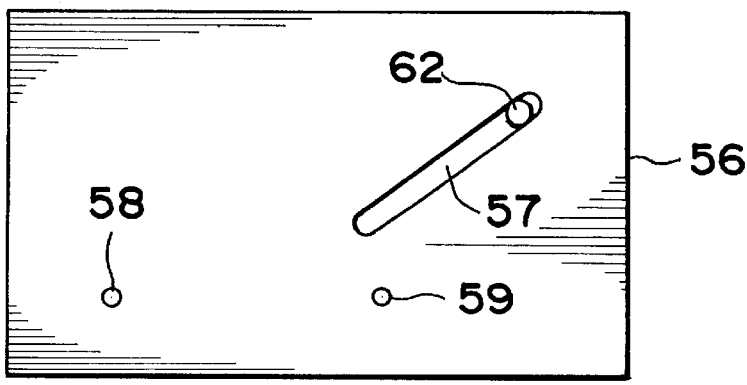
FIG. 4 is a plan view showing a fixing plate of a base member of FIG. 2.

The fixing plate 56 of the base member 54, as shown in FIG. 4, has a cam hole 57, and a pair of straight-advance guide pins 58, 59 protrusively provided vertical to a surface of the fixing plate 56. The movable plates 16, 26, 36, 46 of the first to fourth lens support members 14, 24, 34, 44, have three through holes, respectively.

Figure 5:
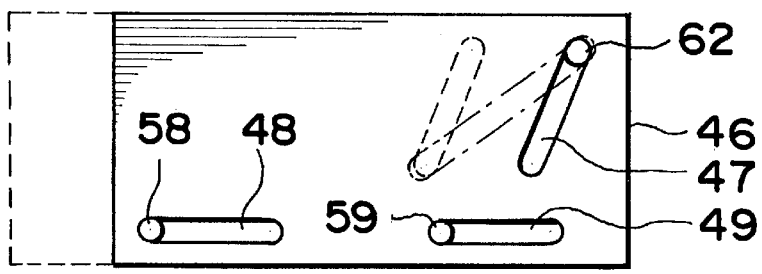
FIG. 5 is a plan view showing a movable plate of a lens support member of FIG. 2.
Figure 6:
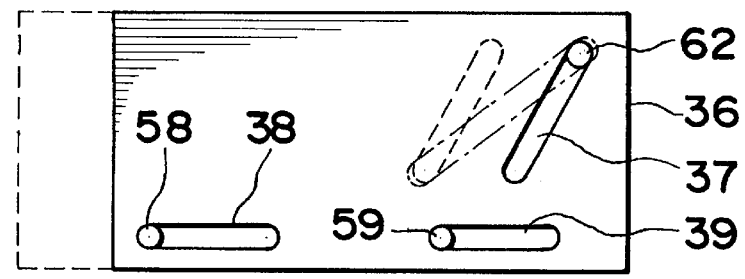
FIG. 6 is a plan view similar to FIG. 5.
Figure 7:
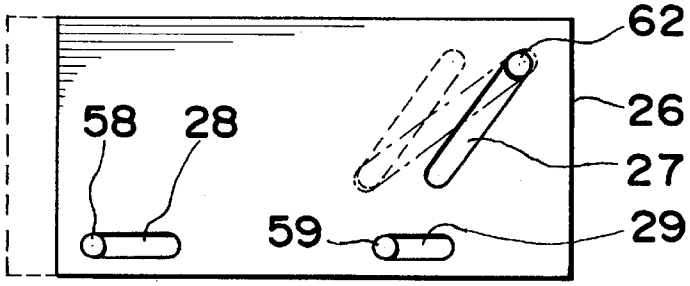
FIG. 7 is a plan view similar to FIG. 5.
Figure 8:
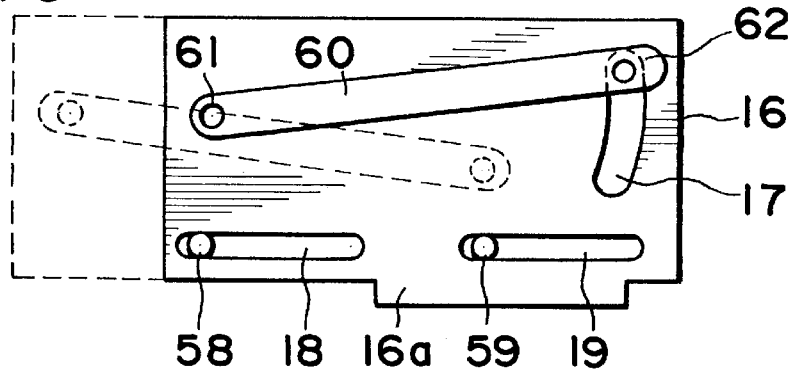
FIG. 8 is a plan view similar to FIG. 5.

That is, the three through holes made in the flat movable plate 16 of the first lens support member 14 are an escape hole 17, and a pair of straight-advance guide holes 18, 19 which are elongate holes extending along the optical axis, as shown in FIG. 8; the three through holes made in the flat movable plate 26 of the second lens support member 24 are a cam hole 27, and a pair of straight-advance guide holes 28, 29 which are elongate holes extending along the optical axis, as shown in FIG. 7; the three through holes made in the flat movable plate 36 of the third lens support member 34 are a cam hole 37, and a pair of straight-advance guide holes 38, 39 which are elongate holes extending along the optical axis, as shown in FIG. 6; and the three through holes made in the flat movable plate 46 of the fourth lens support member 44 are a cam hole 47, and a pair of straight-advance guide holes 48, 49 which are elongate holes extending along the optical axis, as shown in FIG. 5.

Through the pair of straight-advance guide holes 18, 19; 28, 29; 38, 39; 48, 49 of the movable plates 16, 26, 36, 46, the pair of straight-advance guide pins 58, 59 of the fixing plate 56 of the base member 54 are inserted so as to make sliding contact therewith. With the construction, the movable plates 16, 26, 36, 46 of the first to fourth lens support members 14, 24, 34, 44 are supported to the fixing plate 56 of the base member 54 so that the movable plates 16, 26, 36, 46 thereof are guided straight along the optical axis.

Also, the movable plate 16 of the first lens support member 14, as shown in FIGS. 2 and 8, has an interlocking bar 60 one end 61 of which is rotatably fixed to the movable plate 16. An interlocking pin 62 is protrusively provided to the other end of the interlocking bar 60. This interlocking pin 62, passing through the escape hole 17 of the movable plate 16 of the first lens support member 14, is inserted through the cam holes 27, 37, 47 of the movable plates 26, 36, 46 of the second to fourth lens support members 24, 34, 44, and through the cam hole 57 of the fixing plate 56 of the base member 54, so that the interlocking pin 62 thereof slidably contact the cam holes 27, 37, 47 and the escape hole 17.

When the movable plate 16 of the first lens support member 14 moves along the optical axis, the movable plates 26, 36, 46 of the second to fourth lens support members 24, 34, 44 also move along the optical axis with a state in which they are overlapped one over the other. Along with the movements of the movable plates 16, 26, 36, 46 of the first to fourth lens support members 14, 24, 34, 44, relative to the fixing plate 56 of the base member 54, the first to fourth lens groups 12, 22, 32, 42 do a specified zoom movement as shown in FIG. 3.

The movable plate 16 of the first lens support member 14 is moved along the optical axis by a driving mechanism 70 which is fixed to the fixing plate 56 of the base member 54.

Figure 9:
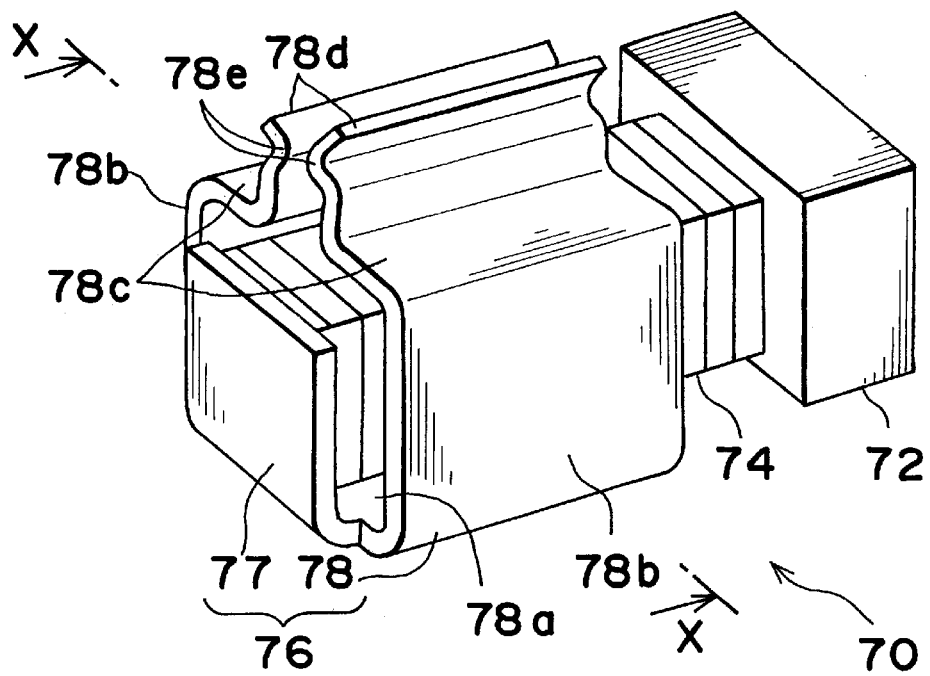
FIG. 9 is a perspective view of a driving mechanism used in the optical unit shown in FIG. 2.

The driving mechanism 70, as shown in FIG. 2 and the perspective view of FIG. 9, is a linear actuator in which an engaging member 76 is fixed to one end face of a lamination type of piezoelectric device 74 in a direction of its lamination. The other end face of the lamination type of piezoelectric device 74 is fixed to a fixing part 72. The fixing part 72 is fixed to the fixing plate 56 of the base member 54. The driving mechanism 70, i.e. the lamination type of piezoelectric device 74 and the engaging member 76, is supported by the one end face of the fixing part 72 in a cantilever state, and extends along the optical axis with being kept separate from a surface of the fixing plate 56.

The lamination type of piezoelectric device 74 is constituted by a lamination of a plurality of piezoelectric elements, the direction of its lamination being coincident with the direction of the optical axis. The lamination type of piezoelectric device 74 is an electromechanical transduction device or electromechanical transducer, which is so arranged as to be expanded and contracted in the direction of its lamination when a predetermined voltage applies thereto.

Figure 10:
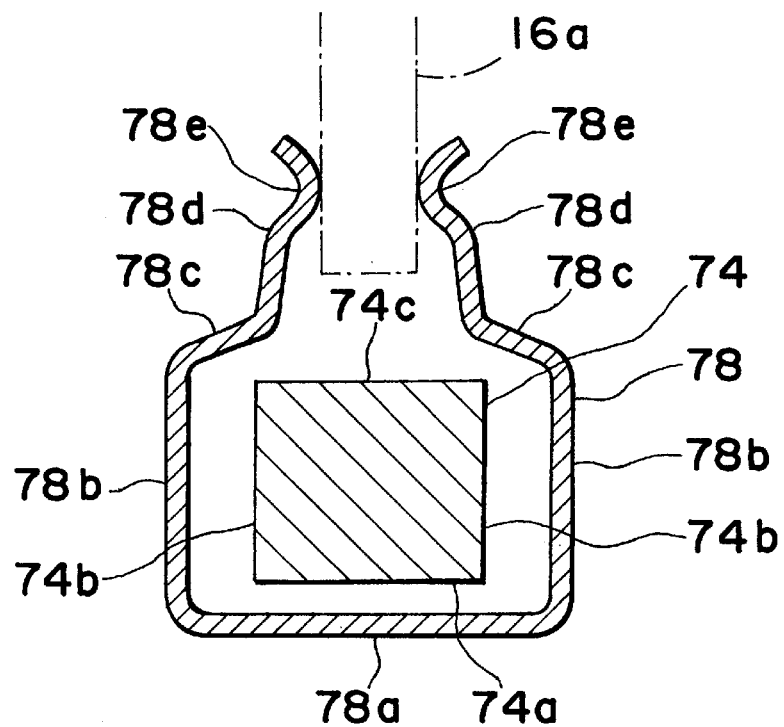
FIG. 10 is a sectional view taken along a line X—X of FIG. 9.

The engaging member 76 has a fixing wall portion 77 which is fixed to the one end face of the lamination-type piezoelectric device 74, and has a support wall portion 78 extending from the fixing wall portion 77 so as to wrap around a side face of the lamination-type piezoelectric device 74. The support wall portion 78, as shown in FIGS. 2, 9, and 10 that is a sectional view taken perpendicularly to the optical axis, comprises: a bottom piece 78a which is bent generally perpendicularly from one side edge of the fixing wall portion 77 toward the lamination-type piezoelectric device 74 so as to cover a bottom face 74a of the lamination-type piezoelectric device 74; a pair of side pieces 78b which are bent from both side edges of the bottom piece 78a generally perpendicularly so as to cover both side faces 74b of the lamination-type piezoelectric device 74; two upper pieces 78c which are bent inward and generally perpendicularly from the upper side edges of the side pieces 78b so as to cover a top face 74c of the lamination-type piezoelectric device 74; and two rising pieces 78d which are bent from both the upper pieces 78c so as to be directed upward at locations generally corresponding to a central part of the top face 74c of the lamination-type piezoelectric device 74.

The two rising pieces 78d extend generally parallel to each other, each having at an end portion a protrusion 78e projecting inward respectively. Between the two protrusions 78e, a lower edge portion 16a of the movable plate 16 of the first lens support member 14 is elastically pressed so as to contact the two protrusions 78e, as shown in FIGS. 2 and 10. With the construction, the lower edge portion 16a and the protrusions 78e are frictionally engaged with each other. This means that the protrusions 78e serve as frictional engaging portions.

The frictional engagement of the protrusions 78e with the movable plate 16, allows the driving member 70 to move the first lens support member 14. More specifically, as the protrusions 78e of the engaging member 76 of the driving mechanism 70 move slowly, the lower edge portion 16a of the movable plate 16 of the first lens support member 14 is moved integrally with the protrusions 78e by the frictional force between the protrusions 78e and the lower edge portion 16a. Meanwhile, as the protrusions 78e thereof move quickly or with a rapid or quick change in speed, an inertial force due to the first lens support member 14 etc, surpasses the frictional force exerting between the protrusions 78e and the lower edge portion 16a, thus causing a slide therebetween so that the protrusions 78e move relative to the lower edge portion 16a.

Accordingly, the first lens support member 14 can be fed or driven intermittently in small steps bit by bit in either forward or backward direction, with the following operations.

That is, for example, when a periodic voltage of saw-toothed shape, or a voltage of full-wave rectified shape, for instance, generated by an unshown voltage generator which is a driving device for actuating the lamination-type piezoelectric device 74, is supplied to the piezoelectric device 74 so as to bring a sudden change in speed of the protrusions 78e by the expansion and contraction of the piezoelectric device 74, there occurs a slide between the protrusions 78e and the lower edge portion 16a of the first lens support member 14, thus the first lens support member 14 remaining stationary relative to the flat fixing plate 56.

Meanwhile, for example, when a predetermined voltage is supplied to the piezoelectric device 74 so as to bring a gentle change in speed of the protrusions 78e by the expansion and contraction of the piezoelectric device 74, there occurs no slide between the protrusions 78e and the lower edge portion 16a of the first lens support member 14, thus the first lens support member 14 moving together with the protrusions 78a relative to the flat fixing plate 56.

Therefore, the first lens support member 14 can be fed or driven intermittently in small steps in either forward or backward direction, by selecting a particular type or pattern of the voltage, as mentioned above, which is supplied to the piezoelectric device 74.

Alternatively, it is also possible to construct the mechanism so that the sliding direction and distance at time of the forward movement differ from the sliding direction and distance at time of the backward movement while there occurs a slide between the protrusions 78e and the lower edge portion 16a. With the construction and operation, the first lens support member 14 is moved relative to the flat fixing plate 56 in either direction while the first lens support member 14 is being vibrated. In this construction, the moving direction of the first lens support member 14 relative to the flat fixing plate 56 can also be changed by changing the pattern of voltage which is applied to the lamination-type piezoelectric device 74.

The support wall portion 78 extends so as to wrap around the lamination-type piezoelectric device 74. With this construction, the distance from the fixing wall portion 77 to the protrusions 78e can be long to some degree so that a desired spring constant can be realized, while the frictional engaging portions therebetween can be located close to the lamination-type piezoelectric device 74 so that the moment that acts from the frictional engaging portions upon the lamination-type piezoelectric device 74 can be made as small as possible.

As described above, when the first lens support member 14 is moved along the optical axis relative to the flat fixing plate 56 by the driving mechanism 70, the second to fourth lens support members 24, 34, 44 of the optical unit 4 in the digital camera 1 are moved relative thereto with a state in which the interlocking pin 62 of the interlocking bar 60 engages the cam holes 27, 37, 47, 57, respectively.

In the operation, the first to fourth lens support members 14, 24, 34, 44, which are biased against the fixing plate 56 by the biasing spring 64, move along the fixing plate 56, while they are guided so as to advance straight along the optical axis by the engagement of the pair of straight-advance guide pins 58, 59 protrusively provided to the fixing plate 56 with their respective pair of straight-advance guide holes 18, 19; 28, 29; 38, 39; 48, 49. As a result, the lens groups 12, 22, 32, 42 fixed to the lens support portions 15, 25, 35, 45, respectively, are driven for the zooming operation with a higher precision along the optical axis, without tilting.

According to the construction, the lens support members 14, 24, 34, 44, the base member 54, and the like, by which the lens groups 12, 22, 32, 42 are driven respectively, are arranged so as to be stacked one over the other and so as to be gathered on one radial side of the lens groups 12, 22, 32, 42. Therefore, the thickness of their stack can be made into a size approximately equal to or smaller than the diameter of each lens group 12, 22, 32, 42. In other words, it is possible to constitute the optical unit 4 with the zoom lens mechanism the dimension in one direction of which can be reduced as much as possible.

In this digital camera 1, because of a small light-receiving surface of the CCD element 90, the allowance in errors of decentering the lens groups 12, 22, 32, 42 is small. For this reason, it is difficult to realize a desired positional precision of the lens groups 12, 22, 32, 42 with respect to the optical axis, only by enhancing the precision of the components such as the lens support members 14, 24, 34, 44 and the base member 54. Therefore, in order to attain such a specified positional precision, first, the lens support mechanisms are assembled except the fitting of the lens groups 12, 22, 32, 42, and then the lens groups 12, 22, 32, 42 are fixed to the lens support portions 15, 25, 35, 45 of the lens support members 14, 24, 34, 44, respectively, while the lens groups 12, 22, 32, 42 are aligned one by one in the following way.

Figure 11:
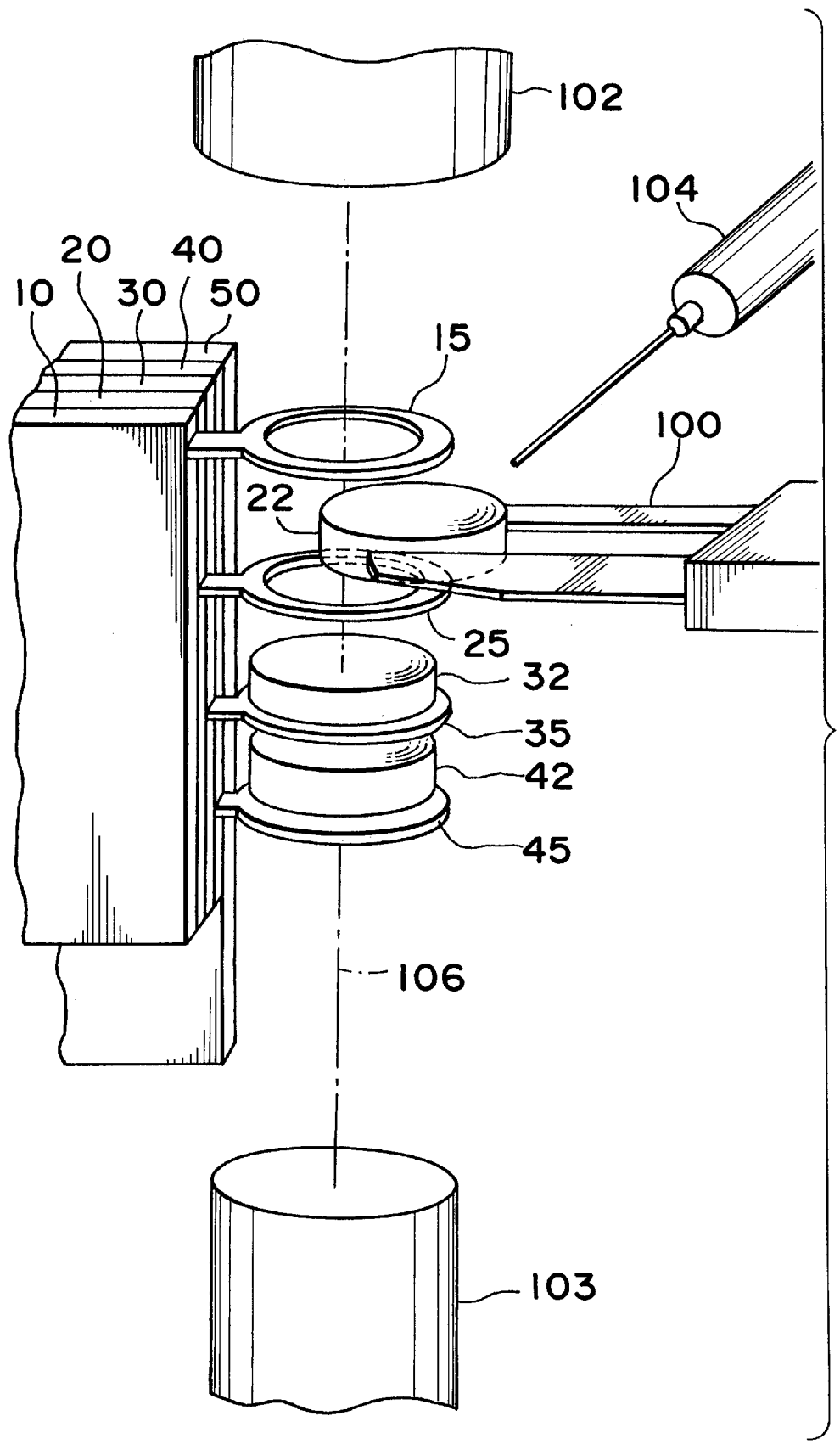
FIG. 11 is an explanatory view of how to fit a lens group to the optical unit of FIG. 2.

That is, as shown in the perspective view of FIG. 11, a floodlight or a light emitter 102, and a light receiver 103, are fixed at a predetermined fore and back positions along an optical axis 106 of the lens support mechanisms the assemblage of which is already finished except that the lens groups 12, 22, 32, 42 are not yet mounted on the lens support mechanisms. At this step, the lens support portions 15, 25, 35, 45 are arranged along the optical axis.

Next, one appropriate lens group, such as the second lens group 22, is gripped at its outer circumferential surface by a lens gripper 100, is placed on the specified lens support portion 25, i.e. its lens frame 25, from a direction generally perpendicular to the optical axis 106, and is positioned so that the center of the lens group 22 is aligned with the optical axis 106 under the observation of an output from the light receiver 103.

More specifically, for example, a light, parallel to the optical axis, is emitted from the floodlight 102; the light receiver 103 is placed at a position corresponding to the focal length of the lens group 22; and the lens group 22 is aligned relative to the optical axis by moving the lens group 22 radially while observing the image of the light receiver 103.

Next, keeping to hold the lens group 22 so that the lens group 22 is aligned relative to the optical axis, an adhesive is applied to the circumference of the lens group 22 by using an adhesive injector 104, and the lens group 22 is adhesively bonded to the lens support portion 25. In this step, the lens group 22 can be prevented from any positional shift or dislocation during the bonding process thereof, by holding the lens group 22 in position until the adhesive is cured. Alternatively, the adhesive may be applied to the lens support portion 25 in advance before the lens group 22 is placed thereon.

By repeating the above operations and steps in an appropriate order for each of the lens groups 12, 22, 32, 42, the lens groups 12, 22, 32, 42 can be fitted along the optical axis 106 with a high precision.

Therefore, it is possible to align not only the lens groups 12, 42 placed at the front and rear ends of the zoom lens mechanism, but also the intermediate lens groups 22, 32.

In the above constitution, the optical unit 4 is open almost around the entire circumference of the lens support portions 15, 25, 35, 45. Therefore, it is easy to make an access of each of the lens groups 12, 22, 32, 42 to each of the lens support portions 15, 25, 35, 45. By the way, if there is a space or opening, inside the optical unit 4, which corresponds to at least a diameter of the lens groups 12, 22, 32, 42, it is possible to make an access of each of the lens groups 12, 22, 32, 42 to each of the lens support portions 15, 25, 35, 45, as explained above.

In the first embodiment described above, the protrusions 78e of the driving member 70 are used to elastically pinch or hold the lower edge portion 16a of the first lens support member 14.

Alternatively, it is also possible that a part of the driving member is pinched or held by a part on a side of the first lens support member, contrary to the first embodiment, as shown in a second embodiment and a third embodiment, respectively, below. Hereinbelow, the second and third embodiments are described by focusing on their differences from the first embodiment with reference to FIGS. 12 and 13, respectively.

The second embodiment is described with reference to FIG. 12.

Figure 12:
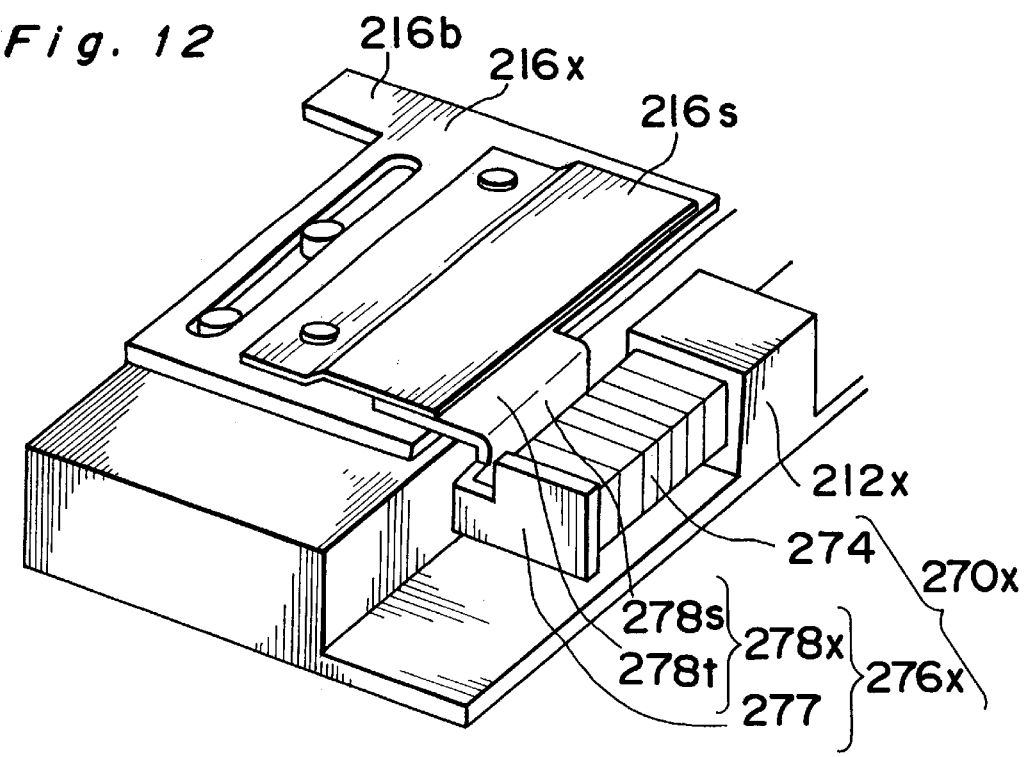
FIG. 12 is a perspective view illustrating a main part of a driving mechanism used in a digital camera according to a second embodiment of the present invention.

That is, in the second embodiment shown in FIG. 12, an engaging member 276x of a driving mechanism 270x has a fixing wall portion 277 which is fixed to one end portion of a lamination type of piezoelectric device 274, and has a support wall portion 278x which extends from the fixing wall portion 277 on one side of the lamination type of piezoelectric device 274. The support wall portion 278x has a first piece, i.e. a side piece 278s, which is bent generally perpendicularly to the fixing wall portion 277 toward the lamination type of piezoelectric device 274 so as to cover the one side of the lamination type of piezoelectric device 274, and has a second piece, i.e. a wing piece 278t, which is bent from a top side edge of the side piece 278s generally perpendicularly on the side opposite the lamination type of piezoelectric device 274. By the way, a part indicated by a reference numeral 212x corresponds to the part indicated by the reference numeral 72 in the first embodiment.

The wing piece 278t is held or pinched between a movable plate 216x which is mounted movably along the optical axis, and a biasing plate 216s which is fixed to the movable plate 216x, in which the wing piece 278t frictionally engages between the movable plate 216x and the biasing plate 216s.

In the construction, as in the first embodiment, the lamination type of piezoelectric device 274 are expanded and contracted in a specified pattern when a predetermined voltage is applied thereto. At this time, there occurs a relative movement between the movable plate 216x as well as the biasing plate 216s, and the wing piece 278t of the driving member 270x, with a slide and feed therebetween, so that the movable plate 216x together with the biasing plate 216s can be moved relative to the flat fixing plate (unshown). Because the wing piece 278t is placed close to the lamination type of piezoelectric device 274, a moment that acts from the frictional engaging portion therebetween on the lamination type of piezoelectric device 274 is lessened as much as possible with the simple constitution.

By the way, a protrusion 216b at one end part of the movable plate 216x is fixed to or engaged with an unshown first lens support member which is generally similar in construction to the first lens support member 14 in the first embodiment, so that the unshown first lens support member is moved integrally with the movable plate 216x bidirectionally along the optical axis.

Next, the third embodiment is described with reference to FIG. 13.

Figure 13:
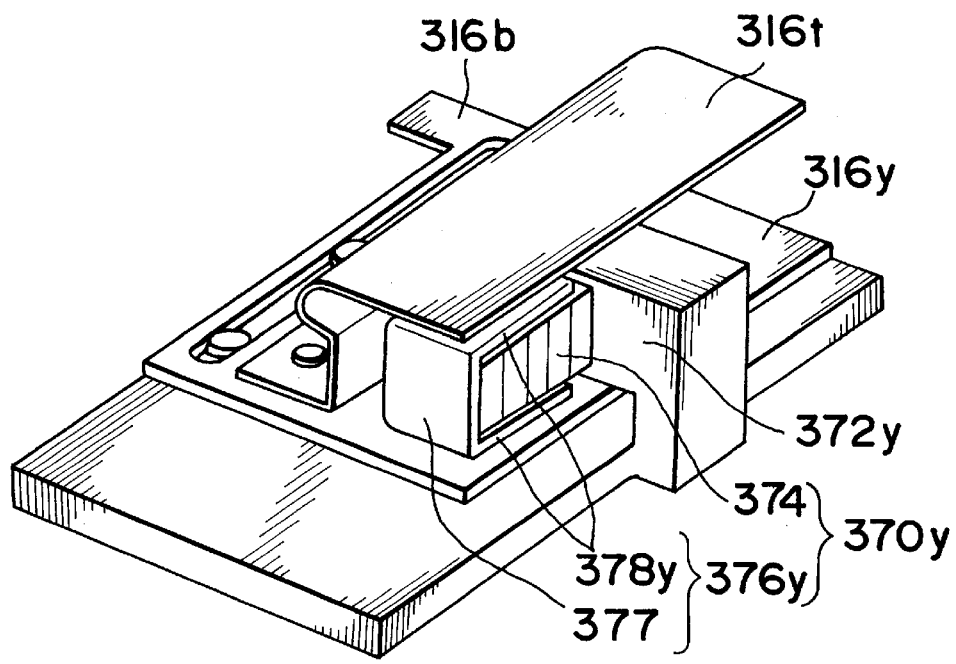
FIG. 13 is a perspective view illustrating a main part of a driving mechanism used in a digital camera according to a third embodiment of the present invention.

According to the third embodiment, as shown in FIG. 13, an engaging member 376y of a driving mechanism 370y has a fixing wall portion 377 which is fixed to an end portion of a lamination type of piezoelectric device 374, and a pair of support wall portions 378y which are bent generally perpendicularly to a top side edge and a bottom side edge of this fixing wall portion 377 so as to extend along both a top side and a bottom side of the lamination type piezoelectric device 374.

The pair of support wall portions 378y as engaging pieces, are pinched or held between a movable plate 316y which is movably mounted relative to an unshown fixing plate along an optical axis and a biasing plate 316t which is elastically fixed to the movable plate 316y, so that the pair of support wall portions 378y frictionally engage the movable plate 316y and the biasing plate 316y with a state in which the piezoelectric device 374 is interposed between the pair of support wall portions 378y. By the way, a part indicated by a reference numeral 372y corresponds to the part indicated by the reference numeral 72 in the first embodiment. In the construction, by canceling the moments that act from the frictional engaging portion on the lamination type of piezoelectric device 374, it is possible with a simple constitution that no moment acts on the lamination type of piezoelectric device 374 as a whole.

By the way, a protrusion 316b at one end part of the movable plate 316y is fixed to or engaged with an unshown first lens support member which is generally similar in construction to the first lens support member 14 in the first embodiment, so that the unshown first lens support member is moved integrally with the movable plate 316y bidirectionally along the optical axis.

Figure 14:
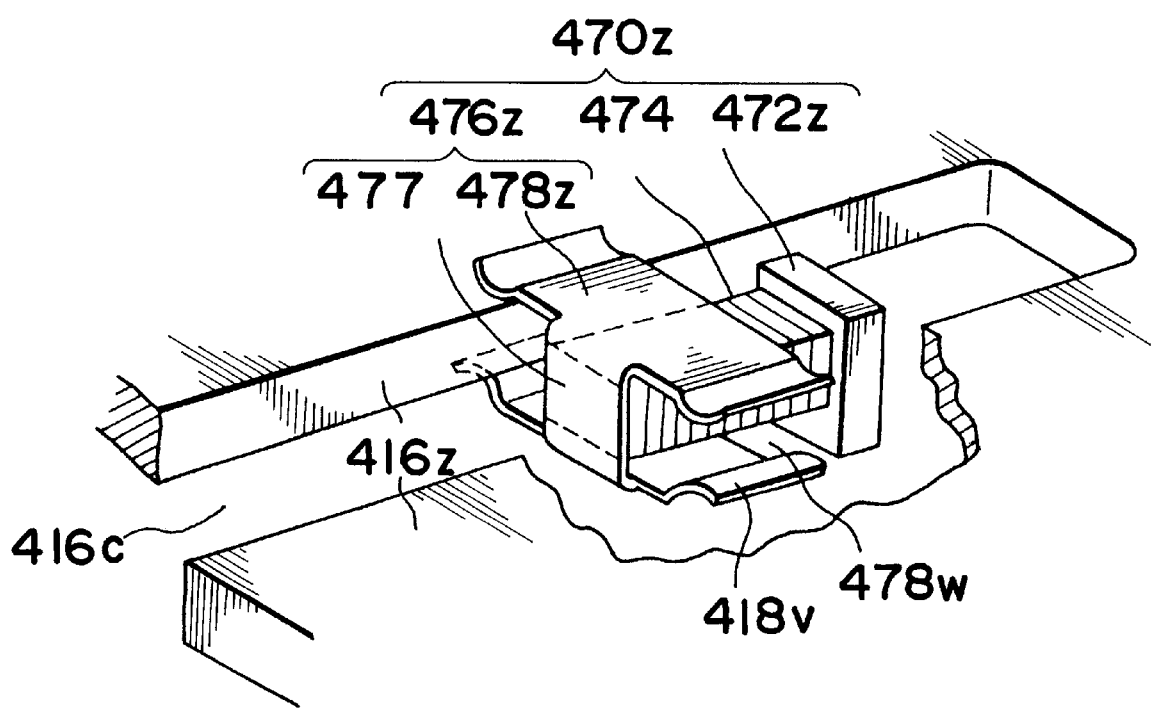
FIG. 14 is a perspective view illustrating a main part of a driving mechanism used in a digital camera according to a fourth embodiment of the present invention.
Figure 15:
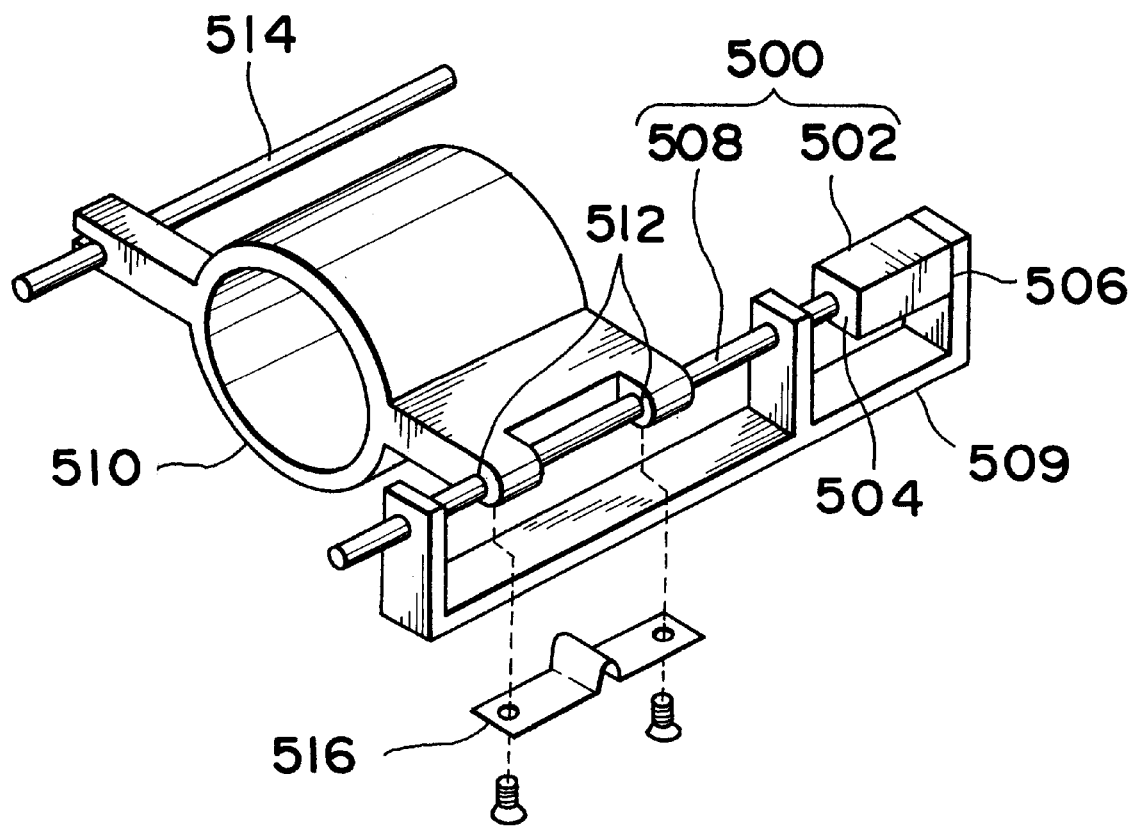
FIG. 15 is a perspective view illustrating a main part of a linear actuator, as a driving mechanism, used in a digital camera according to a prior art.

Next, the fourth embodiment is described with reference to FIG. 14.

In the fourth embodiment, a driving mechanism 470z has a pair of frictional engaging portions on both sides of a lamination type of piezoelectric device 474, which is similar to the construction in the third embodiment.

That is, a movable plate 416z has a cutout 416c extending along an optical axis, and the driving mechanism 470z is disposed within the cutout 416c. An engaging member 476z of the driving mechanism 470z has a fixing wall portion 477 which is fixed to an end face of the lamination type of piezoelectric device 474, and has a pair of support wall portions 478z which are bent generally perpendicularly from a top side edge and a bottom side edge of the fixing wall portion 477 so as to extend along both an upper side and a lower side of the lamination type of piezoelectric device 474.

The pair of support wall portions 478z extend over the upper side of the piezoelectric device 474 and below the lower side thereof, rightward and leftward, respectively. At right and left end portions of the support wall portions 478z, are formed protrusions 418v which face each other in each of the right and left end portions of the support wall portions 478z.

Each pair of the protrusions 418v facing each other has a narrower gap therebetween. With the construction, an edge part around the cutout 416c of the movable plate 416z is pinched or held by the pairs of the protrusions 418v facing each other so that the pairs thereof frictionally engage the edge part around the cutout 416c. By the way, a part indicated by a reference numeral 472z corresponds to the part indicated by the reference numeral 72 in the first embodiment. Since the frictional engaging portions of this driving mechanism 470z is positioned on both sides of the lamination type of piezoelectric device 474 with the frictional engaging portions thereof sandwiching the piezoelectric device 474 therebetween, it is possible that the moments that act from the right-and-left frictional engaging portions on the lamination type of piezoelectric device 474 cancel out each other, so that no moment acts on the lamination type of piezoelectric device 474.

Although the present invention has been fully described in connection with the preferred embodiments thereof with reference to the accompanying drawings, it is to be noted that various changes and modifications are apparent to those skilled in the art.

For example, alternatively, it is possible that two sets of zoom-lens optical systems are provided on both sides of the movable plates 16, 26, 36, 46.

On the other hand, although the linear actuators, i.e. the driving mechanisms 70, 270x, 370y, 470z, have the lamination type of piezoelectric device 74, 274, 374, 474 as an electromechanical transducer device that receives a specified electrical signal for its displacement responsive thereto, other electromechanical transducer devices, like electrostatic actuators and electrostrictive elements, etc., may be used.

The linear actuators 70, 270x, 370y, 470z described above, are applicable to a variety of fields other than the zoom lens mechanism.

Such changes and modifications are to be understood as included within the scope of the present invention as defined by the appended claims unless they depart therefrom.

What is claimed is:

1. A zoom lens mechanism, comprising:
   a stationary member;
   a plurality of movable members which are layered to be adjacent to each other and to the stationary member and which are slidable along a straight line relative to each other and to the stationary member in a direction of an optical axis;
   a driving device which moves the movable members by predetermined distances with respect to the stationary member respectively in the direction of the optical axis;
   a lens support part which projects from a side of each of the movable members; and
   a lens group which is supported by the lens support part.

2. The zoom lens mechanism as claimed in claim 1, wherein the movable members comprise a first plate and a second plate, and
   wherein the driving device comprises:
   a first drive device which moves the first plate by a first distance with respect to the stationary member in the direction of the optical axis; and
   a second drive device which moves the second plate and which interlocks with a movement of the first plate so that the second drive device moves the second plate by a second distance with respect to the stationary member in the direction of the optical axis when the first plate moves by the first distance.

3. The zoom lens mechanism as claimed in claim 2, wherein the first drive device comprises:
   a piezoelectric transducer which produces a repeatable linear displacement in the direction of the optical axis in response to a voltage which is supplied thereto; and
   a frictional engaging member which is fixed to one of a pair of ends of the piezoelectric transducer.

4. The zoom lens mechanism as claimed in claim 3, wherein the other of the pair of ends of the piezoelectric transducer is fixed to the stationary member, and the frictional engaging member frictionally engages the first plate.

5. The zoom lens mechanism as claimed in claim 4, wherein the lens support parts project from a same side of the movable members along the direction of optical axis,
   wherein the piezoelectric transducer is arranged at a location opposite the same side of the movable members, and
   wherein the frictional engaging member frictionally engages an edge part of the first plate, in which the edge part is opposite the same side of the movable members and in which the edge part of the first plate is generally in parallel with the optical axis.

6. The zoom lens mechanism as claimed in claim 5, wherein the frictional engaging member comprises:
   a fixing wall part which is fixed to the one of the pair of ends of the piezoelectric transducer;
   a support wall part which connects to a periphery of the fixing wall part and which extends generally along a side of the piezoelectric transducer; and
   a frictional engaging part which is supported near the side of the piezoelectric transducer by the support wall part.

7. The zoom lens mechanism as claimed in claim 2, wherein the second drive device comprises:
   a first cam groove which is provided on the stationary member;
   a cam follower which is driven by the first cam groove of the stationary member when the first plate is moved by the first drive device; and
   a second cam groove which is provided on the second plate and which engages the cam follower,
   wherein the second plate is moved by a movement of the cam follower.

8. The zoom lens mechanism as claimed in claim 7, wherein the second drive device further comprises an interlocking bar which is arranged along the first plate, in which one of a pair of ends of the interlocking bar is rotatably supported on the first plate and in which the cam follower is supported by the other of the pair of ends of the interlocking bar.

9. The zoom lens mechanism as claimed in claim 2, wherein the stationary member further comprises a pair of pins for guiding the movable member straight relative to the stationary member, in which the pair of pins project in a direction in which the plurality of movable members are overlapped one over the other on the stationary member, wherein each of the movable members comprises a pair of holes for guiding the movable member straight relative to the stationary member in the direction of optical axis, in which the pair of holes are provided in the direction of optical axis, respectively, and wherein the pair of pins of the stationary member respectively pass through the pair of holes of each of the movable members with the pair of pins frictionally engaging the pair of holes, so that each of the movable members are guided straight in the direction of optical axis with respect to the stationary member.

10. The zoom lens mechanism as claimed in claim 1, wherein the lens group can be mounted on the lens support part in a direction generally perpendicular to the direction of optical axis.

11. The zoom lens mechanism as claimed in claim 1, wherein the movable members comprise a first flat plate and a second flat plate.

12. A method for assembling a zoom lens mechanism, comprising:

assembling a lens support mechanism which supports a first lens frame and a second lens frame so that the first lens frame and the second lens frame are movable in a straight line relative to each other, and arranging the first lens frame and the second lens frame along an optical axis;

giving access to the first lens frame in a direction generally perpendicular to the optical axis, and fixing a first lens group to the first lens frame;

giving access to the second lens frame in the direction generally perpendicular to the optical axis, and fixing a second lens group to the second lens frame while the second lens group is aligned relative to the first lens group.

13. The method as claimed in claim 12, further comprising fixing the first lens group and the second lens group to flat portions of the first lens frame and the second lens frame only by adhesive, respectively.

14. The method as claimed in claim 12, further comprising supporting a third lens frame along the optical axis by said lens support mechanism so that the third lens frame is movable relative to the first lens frame and the second lens frame, and giving access to the third lens frame in the direction generally perpendicular to the optical axis, and fixing the third lens group to the third lens frame while the third lens group is aligned relative to the first lens group and the second lens group.

15. A method for driving a zoom lens, comprising the steps of:

driving a first plate in a straight line in a direction of the optical axis by a driving source, wherein the first plate holds a first lens group, and wherein the first plate is movably supported in the direction of the optical axis by a stationary plate; and driving a second plate in a straight line in the direction of the optical axis by interlocking with a movement of the first plate, wherein the second plate holds a second lens group, wherein the second plate is movable relative to the first plate and the stationary plate, and wherein the second plate is movably supported in the direction of the optical axis by the stationary plate.

16. The method as claimed in claim 15, further comprising a step of:

driving a third plate in a straight line in the direction of the optical axis by interlocking with the movement of the first plate, wherein the third plate holds a third lens group, wherein the third plate is movable relative to the first plate, the second plate and the stationary plate, and wherein the third plate is movably supported in the direction of the optical axis by the stationary plate.

17. The method as claimed in claim 15, wherein the first plate and the second plate are flat.

18. A linear actuator comprising:

a piezoelectric element which expands and contracts in a displacement direction, in response to a predetermined electric signal that is applied to the piezoelectric element; and an engaging member which is fixed to one of a pair of end faces in the displacement direction of the piezoelectric element, wherein the engaging member frictionally engages a first member, and the other of the pair of end faces in the displacement direction of the piezoelectric element is fixed to a second member, in which an expansion and contraction of the piezoelectric element causes a sliding movement in a straight line between the engaging member and the first member and causes a feed of the engaging member and the first member relative to the second member so that there occurs a relative movement along a straight line between the first member and the second member, and wherein the engaging member comprises:

a fixing wall part which is fixed to the one of the pair of end faces of the piezoelectric elements, a support wall part which is fixed to a periphery of the fixing wall part, and which generally extends along a side of the piezoelectric element, and a frictionally engaging part which is supported by the support wall part, in which the frictionally engaging part frictionally engages the first member, and in which the frictionally engaging part extends on a side of the piezoelectric element.

19. The linear actuator as claimed in claim 18, wherein the fixing wall part, the support wall part, and the frictionally engaging part are integrally formed, wherein the fixing wall extends in a first planar direction, wherein the support wall part comprises:

a first piece which is connected to an edge of the fixing wall part, and which extends in a second planar direction that generally corresponds to a direction in which the piezoelectric element extends and that is generally perpendicular to the first planar direction, a pair of second pieces each of which is connected to each of a pair of edges, of the first piece, extending in the direction in which the piezoelectric element extends, wherein the second piece extends, in a third planar direction generally perpendicular to both the first planar direction and the second planar direction, up to a part, of the piezoelectric element, opposite the first piece, and a pair of third pieces each of which is connected to each of a pair of edges, of the second pieces, opposite the first piece, in which a pair of the third pieces face towards each other along the part, of the piezoelectric element, opposite the first piece so that the pair of the third pieces cooperate with each other to frictionally engage the first member.

20. The linear actuator as claimed in claim 18, wherein the fixing wall part, the support wall part, and the frictionally engaging part are integrally formed, wherein the fixing wall extends in a first planar direction, wherein the support wall part comprises:

a first piece which is connected to an edge of the fixing wall part and which extends generally along a length of the piezoelectric element in a second planar direction that is generally perpendicular to the first planar direction, and a second piece which is connected to an edge, extending along the piezoelectric element, of the first piece, and which extends away from the piezoelectric element in a third planar direction which is generally perpendicular to both the first planar direction and the second planar direction, wherein a pair of surfaces of the second piece is frictionally held by a holding member which is provided on the first member.

21. The linear actuator as claimed in claim 18, wherein the fixing wall part, the support wall part, and the frictionally engaging part are integrally formed, wherein the support wall part comprises a pair of engaging pieces each of which is connected to each of a pair of opposing edges of the fixing wall part, wherein each of the engaging pieces extends along a length of the piezoelectric element in a direction generally perpendicular to a direction in which a surface of the fixing wall part extends, and wherein a surface, opposite the piezoelectric element, of each of the engaging pieces, functions as a frictional engaging portion, in which the surfaces of the engaging pieces are frictionally engaged by a holding member which is provided on the first member.

22. The linear actuator as claimed in claim 18, wherein the fixing wall part, the support wall part, and the frictionally engaging part are integrally formed, wherein the fixing wall part extends in a first planar direction, wherein the support wall part comprises a pair of engaging pieces each of which is connected to each of a pair of opposite edges of the fixing wall part, and each of which extends in a second planar direction generally perpendicular to both the first planar direction and a direction in which the piezoelectric element extends, wherein each of the engaging pieces extends on both sides of the piezoelectric element in the second planar direction so that a pair of opposing frictionally engaging projections are formed on each of the both sides of the piezoelectric element, in which the pair of opposing frictionally engaging projections cooperate to frictionally hold the first member.

23. A zoom lens mechanism, comprising:

a fixed plate;

a plurality of flat movable plates which support lenses of lens groups at one end and are slidably layered over one another on said fixed plate, wherein said plurality of flat movable plates are guided in a straight line parallel to an optical axis of the lens groups;

interlocking bars rotatably mounted on a first movable plate;

an interlocking pin projecting from the other end of the bar to engage cam holes in the other movable plates in the fixing plate; and a piezoelectric linear actuator moving the first plate along the optical axis, the other movable plates are interlockedly moved thereby.

* * * * *